United States Patent
Aoki

[19]

[11] Patent Number: 6,151,660
[45] Date of Patent: Nov. 21, 2000

[54] INFORMATION RECORDING/REPRODUCING APPARATUS HAVING SEGMENTED CACHE MEMORY

[75] Inventor: Takashi Aoki, Hachioji, Japan

[73] Assignee: Olympus Optical Co., Ltd., Tokyo, Japan

[21] Appl. No.: 08/916,447

[22] Filed: Aug. 22, 1997

[30] Foreign Application Priority Data

Aug. 23, 1996 [JP] Japan .................................... 8-222775

[51] Int. Cl.[7] .................................................. G06F 12/08
[52] U.S. Cl. ........................................ 711/129; 711/173
[58] Field of Search ..................................... 711/129, 173

[56] References Cited

U.S. PATENT DOCUMENTS

| | | | |
|---|---|---|---|
| 4,905,141 | 2/1990 | Brenza ..................................... | 711/129 |
| 5,247,653 | 9/1993 | Hung ....................................... | 395/500 |
| 5,381,533 | 1/1995 | Peleg et al. ............................. | 395/391 |
| 5,696,698 | 12/1997 | Herluison et al. ...................... | 345/202 |

FOREIGN PATENT DOCUMENTS

| | | |
|---|---|---|
| 2-122345 | 5/1990 | Japan . |
| 3-176726 | 7/1991 | Japan . |
| 8-115169 | 5/1996 | Japan . |
| 8-185271 | 7/1996 | Japan . |

*Primary Examiner*—Hiep T. Nguyen
*Attorney, Agent, or Firm*—Armstrong, Westerman, Hattori, McLeland & Naughton

[57] ABSTRACT

An information recording/reproducing apparatus for recording or reproducing information on or from a recording medium comprises a segmented cache type cache memory having a storage area thereof divided into a plurality of segments and temporarily storing data to be transferred between an upper-level host computer and the recording medium in the segments, and a cache memory management unit for controlling reading or writing of data from or in the cache memory and for managing and retrieving data stored in the cache memory. The number of segments into which the storage area of the cache memory is divided is set on the basis of an optimal number of segments determined according to the conditions for an operation program and management data storage memory existent in the cache memory management unit. Moreover, the size of each segment is set to a value permitting the set number of segments according to the storage capacity of the cache memory.

4 Claims, 7 Drawing Sheets

FIG.8A

1 SEGMENT=8 BLOCKS

WD1 →

| 0 | LBA=0 |
|---|---|
| 1 | 1 |
| 2 | 2 |
| 3 | 3 |
| 4 | 4 |
| 5 | 5 |
| 6 | 6 |
| 7 | 7 |

| 0 | (496) |
|---|---|
| 1 | (497) |
| 2 | (498) |
| 3 | (499) |
| 4 | LBA=500 |
| 5 | 501 |
| 6 | 502 |
| 7 | 503 |

WD2 → (row 4)

| 0 | (248) |
|---|---|
| 1 | (249) |
| 2 | LBA=250 |
| 3 | 251 |
| 4 | 252 |
| 5 | 253 |
| 6 | 254 |
| 7 | 255 |

WD3 → (row 2)

| 0 | (96) |
|---|---|
| 1 | (97) |
| 2 | (98) |
| 3 | (99) |
| 4 | LBA=100 |
| 5 | 101 |
| 6 | 102 |
| 7 | 103 |

WD4 → (row 4)

FIG.8B

1 SEGMENT=32 BLOCKS

WD1 →

| 0 | LBA=0 |
|---|---|
| 1 | 1 |
| 2 | 2 |
| 3 | 3 |
| 4 | 4 |
| 5 | 5 |
| 6 | 6 |
| 7 | 7 |
| 8 | |
| 9 | |
| 10 | |
| 11 | |
| 12 | |
| 13 | |
| 14 | |
| 15 | |
| 16 | |
| 17 | |
| 18 | |
| 19 | |
| 20 | |
| 21 | |
| 22 | |
| 23 | |
| 24 | |
| 25 | |
| 26 | |
| 27 | |
| 28 | |
| 29 | |
| 30 | |
| 31 | |

INFORMATION RECORDING/REPRODUCING APPARATUS HAVING SEGMENTED CACHE MEMORY

BACKGROUND OF THE INVENTION

1. Field of the Invention

The present invention relates to an information recording/reproducing apparatus for realizing high-speed recording or reproducing by temporarily storing data to be transferred between an upper-level host computer and recording medium in a cache memory that is accessible at a high speed.

2. Description of the Related Art

In general, an information recording/reproducing apparatus such as an optical disk unit is used as an external recording apparatus relative to a host computer in an information processing system. Since writing or reading data in or from a recording medium is slower than data transfer between the recording medium and host computer, an information recording/reproducing apparatus having a cache memory as a go-between so that data can be transferred via the cache memory in order to speed up data recording or reproducing has been put to use in recent years. In particular, an optical disk unit using an optical disk as a recording medium generally includes a disk cache memory for temporarily storing record data or reproduced data because it takes too much time for writing data on the recording medium.

In relation to a storage control apparatus disclosed as an information recording/reproducing apparatus having such a cache memory in, for example, Japanese Unexamined Patent Publication No. 2-122345, a proposal has been made for a read-ahead type cache memory in which when a request for reading data is issued, not only data requested by a host computer is read but also data residing in a forward block is read in advance. According to this configuration, if data requested by the host computer is stored in the cache memory, the data is not read from a recording medium but transferred from the cache memory to the host computer. Thus, an access time required for reading can be shortened. Furthermore, the hit ratio of the number of successful accesses to the cache memory during reading can be improved owing to read-ahead reading.

Moreover, in an effort to improve an access time required for writing, an information recording/reproducing apparatus having a write-back type cache memory, in which after data is written in the cache memory, the data is written on a recording medium during an idle time of a CPU, has been proposed.

In this kind of information recording/reproducing apparatus, a ring-buffer type cache memory of which storage area is used continuously repeatedly is generally used as a cache memory. Data stored in the cache memory cannot therefore be retrieved during writing or reading. This poses a problem that the advantage of the cache memory cannot often be drawn out fully.

Proposed in Japanese Unexamined Patent Publication No. 3-176726 is an information recording/reproducing apparatus having a segmented cache type cache memory of which storage area is divided into a plurality of segments. Using this kind of segmented cache type cache memory, for example, data stored in the cache memory during previous writing can be retrieved during reading. When intended data resides in the cache memory, the data is read from the cache memory and transferred to a host computer. This leads to a higher processing speed.

In a conventional segmented cache type cache memory, the number of segments and the size of each segment are not determined through profound discussion. This poses a problem that in some cases or when a random Write command is received continuously, satisfactory performance cannot be expected. Moreover, there is a problem that when common firmware is used to realize an operation program to be run for operating a controller in order to reduce the cost of an information recording/reproducing apparatus, if the size of each segment is fixed, the number of segments becomes too small to draw out the advantage of the cache memory depending on the storage capacity of a cache memory.

OBJECTS AND SUMMARY OF THE INVENTION

An object of the present invention is to provide an information recording/reproducing apparatus making it possible to improve the processing speed for reading or writing.

Another object of the present invention is to provide an information recording/reproducing apparatus capable of allowing a segmented cache type cache memory to exhibit satisfactory performance by defining a segmented cache area composed of an optimal number of segments according to the conditions for a means for managing the cache memory.

According to the present invention, there is provided an information recording/reproducing apparatus for recording or reproducing information on or from a recording medium comprising a segmented cache type cache memory having a storage area thereof divided into a plurality of segments and temporarily storing data to be transferred between an upper-level host computer and a recording medium in the segments, and a cache memory managing means for controlling reading or writing of data from or in the cache memory and for managing and retrieving data stored in the cache memory.

The number of segments into which the storage area of the cache memory is divided is set on the basis of an optimal number of segments determined according to the conditions for an operation program to be run for operating the cache memory managing means and for a management data storage memory in the cache memory managing means. The size of each segment is set to a value permitting the set number of segments according to the storage capacity of the cache memory.

Other features and advantages of the present invention will be fully apparent from the description below.

BRIEF DESCRIPTION OF THE DRAWINGS

FIGS. 8A and 8B are explanatory diagrams concerning the operation of a segmenting method in the embodiment.

DESCRIPTION OF THE PREFERRED EMBODIMENTS

FIGS. 1 to 7 and 8A and 8B show an embodiment of the present invention.

Figure 1:
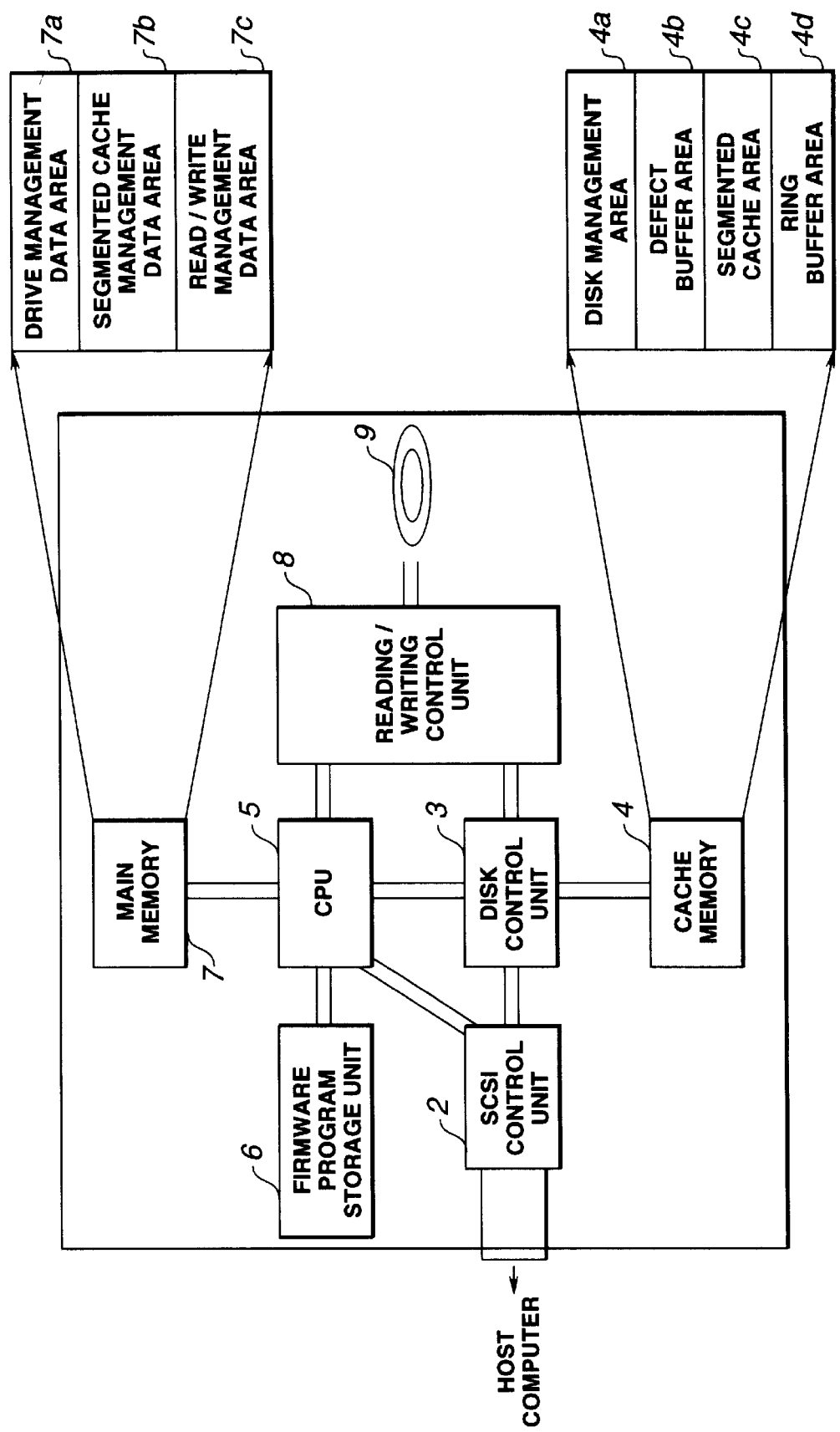
FIG. 1 is a block diagram showing the configuration of an information recording/reproducing apparatus in accordance with an embodiment of the present invention.

FIG. 1 shows the block configuration of an information recording/reproducing apparatus in accordance with the embodiment.

In this embodiment, the configuration of a magneto-optical disk drive unit for recording or reproducing data using a magneto-optical disk is taken as an example of an information recording/reproducing apparatus. The information recording/reproducing apparatus comprises an SCSI control unit 2 connected to a host computer over an interface cable for controlling (protocol) exchange of a command or data through an SCSI, a disk control unit 3 connected to the SCSI control unit 2 for controlling exchange of data relative to a disk 9 serving as a recording medium, a cache memory 4 for temporarily storing data to be read or written from or on the disk 9, a CPU 5 for controlling the operations of the units, a firmware program storage unit 6 for storing an operation program to be run to operate the CPU 5, a main memory 7 providing a work area in which data or the like is stored during operation of the CPU 5, and a reading/writing control unit 8 for controlling a recording/reproducing head for recording or reproducing data on or from the disk 9.

The cache memory 4 is composed of a disk management area 4a in which detect data (disk management information) is stored, a defect buffer area 4b serving as a buffer into which detect data is read, a segmented cache area 4c that is a segmented cache type cache memory area which is divided into a plurality of segments and in which data to be read or written from or on the disk 9 is stored temporarily, and a ring buffer area 4d that is a ring buffer type cache memory area whose storage area is used continuously repeatedly.

The main memory 7 is composed of a drive management data area 7a in which variables (for example, a stack area and global variable) to be specified to run the operation program for operating the CPU 5 are stored; a segmented cache management data area 7b in which management data (for example, a tag table and segment information) used to manage the segmented cache area 4c are stored; and a Read/Write management data area 7c in which a Read/Write parameter queue concerning a Read or Write command is stored.

In the foregoing configuration, a command or data transferred from the host computer is sent to the disk control unit 3 via the SCSI control unit 2. For example, when the command is a Write command, written data is stored in the segmented cache area 4c in the cache memory 4. Management data concerning the written data is stored in the segmented cache management data area 7b in the main memory 7. Management data concerning a Write command is stored in the Read/Write management data area 7c in the main memory 7. When receiving data, the CPU 5 informs the host computer of completion of Write command processing by way of the disk control unit 3 and SCSI control unit 2. Moreover, the CPU 5 sends an instruction to the reading/writing control unit 8 on the basis of the management data so that data is read from the cache memory 4 and written on the disk 9 during an idle time. In short, the information recording/reproducing apparatus of this embodiment is designed to mainly use the segmented cache type cache memory.

Figure 2:
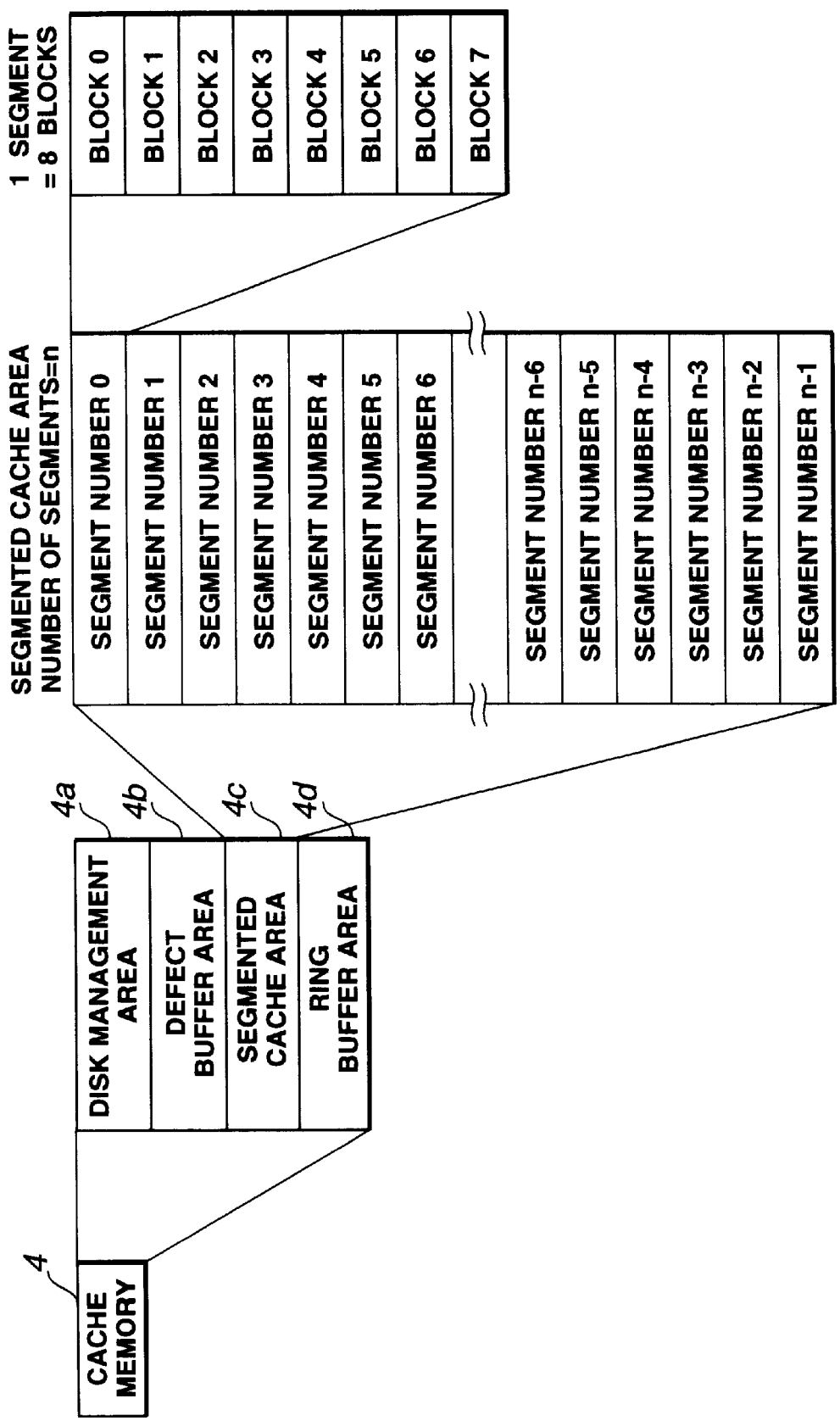
FIG. 2 is a functional block diagram showing the internal configuration of a cache memory in the embodiment.

FIG. 2 shows the structure of the segmented cache area 4c in the cache memory 4. The segmented cache area 4c is divided into a plurality of rooms (segments) whose data areas each serving as a cache memory have the same size. A number ranging from 0 to n−1 (where n denotes the number of segments) is assigned to each segment. In this embodiment, the number of segments is fixed to an optimal value (for example, n ranges from 80 to 100) irrespective of the storage capacity of the segmented cache area 4c (which is, for example, 512K bytes or 2M bytes and may be referred to as a buffer size). The size of one segment is increased or decreased depending on whether the buffer size is large or small, and then the segmented cache area 4c is divided into a plurality of segments so that the segmented cache area has the fixed number of segments. Here, the smallest unit of data to be stored in the cache memory shall be a block (for example, one block=one sector=512 bytes). One segment shall be composed of eight blocks.

By contrast, the ring buffer area 4d needs the storage capacity equivalent to a minimum of 2 blocks. Normally, only two blocks are allocated to the ring buffer area 4d.

Figure 3:
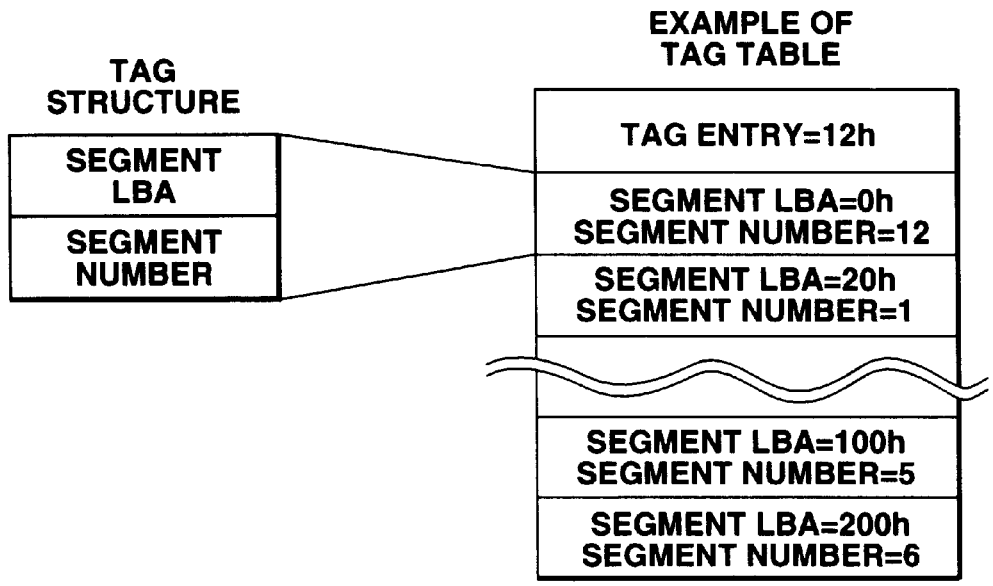
FIG. 3 is a functional block diagram showing a tag structure and tag table.

Next, the structure of segmented cache management data will be described with reference to FIGS. 3 to 5. In a Write or Read command, a logical block address (LBA) and data length are specified. With the LBA and data length, a position on the medium at which data relevant to the command is written is indicated. For storing data in the cache memory 4, the LBA is converted into a segment LBA for specifying a storage position or a position in the cache memory 4 at which the data is stored. When one segment is composed of, for example, 8 blocks, the segment LBA is a multiple of 8.

A combination of the segment LBA and associated segment number shall be referred to as a tag. As shown in FIG. 3, a tag table in which the tags are sorted and arranged in ascending order of segment LBA is contained in the segmented cache management data area 7b in the main memory 7. Based on information stored in the tab table, a segment number can be retrieved in relation to an LBA. The tag table contains the number of entries of tags listed in the table.

Figure 4:
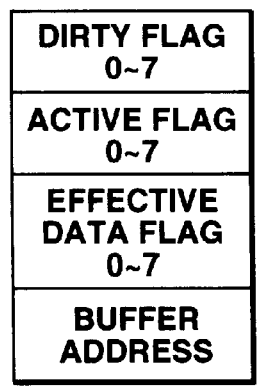
FIG. 4 is a functional block diagram showing the structure of each flag providing segment information.
Figure 5:
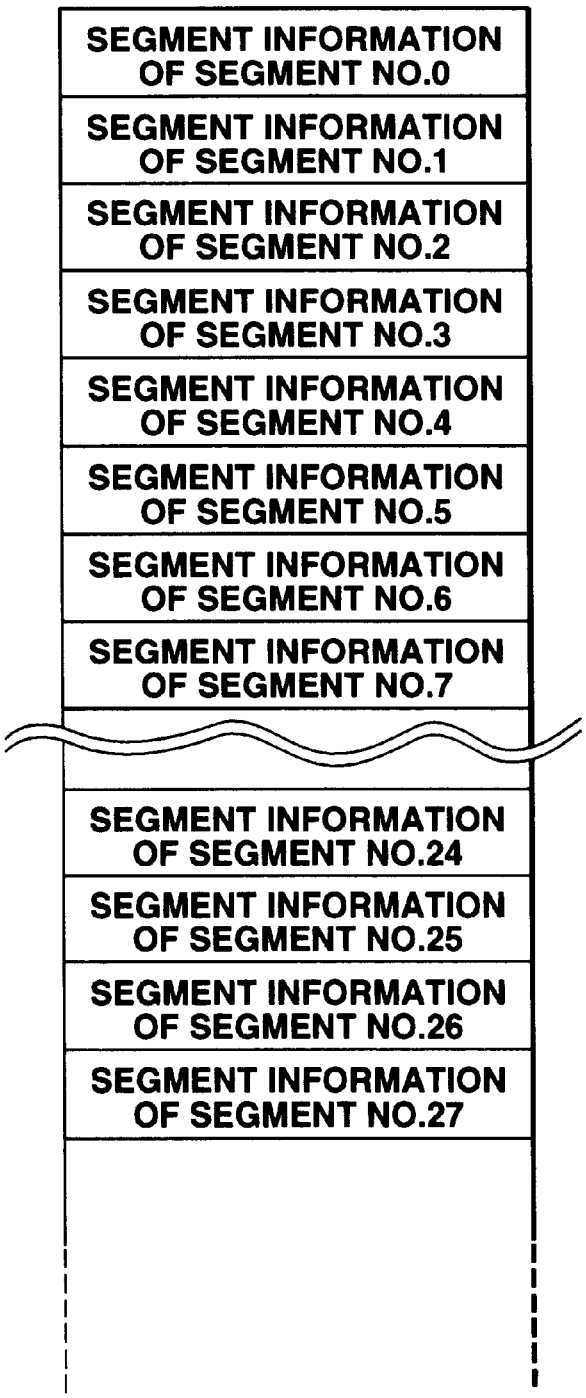
FIG. 5 is a functional block diagram showing a segment information table.

Moreover, a segment information table in which segment information items each composed of, as shown in FIG. 4, a dirty flag, active flag, effective flag, and buffer address are, as shown in FIG. 5, arranged in ascending order of segment number is contained in the segmented cache management data area 7b.

The dirty flag is set when data that has not been written resides. The active flag is set when data is being written or read on or from the medium. The effective data flag is set when effective data resides. Each of these flags has a length of the same number of bits as the number of blocks constituting each segment (for example, when one segment is composed of eight blocks, each flag is 8 bits long of bits 0 to 7). The buffer address indicates a leading address of a segment in a buffer (segmented cache area). These segment information items are arranged in ascending order of segment number and stored in the form of the segment information table shown in FIG. 5 in the segmented cache management data area 7b.

Incidentally, a transfer parameter queue concerning data transfer is contained in the segmented cache management data area 7b.

Figure 6:
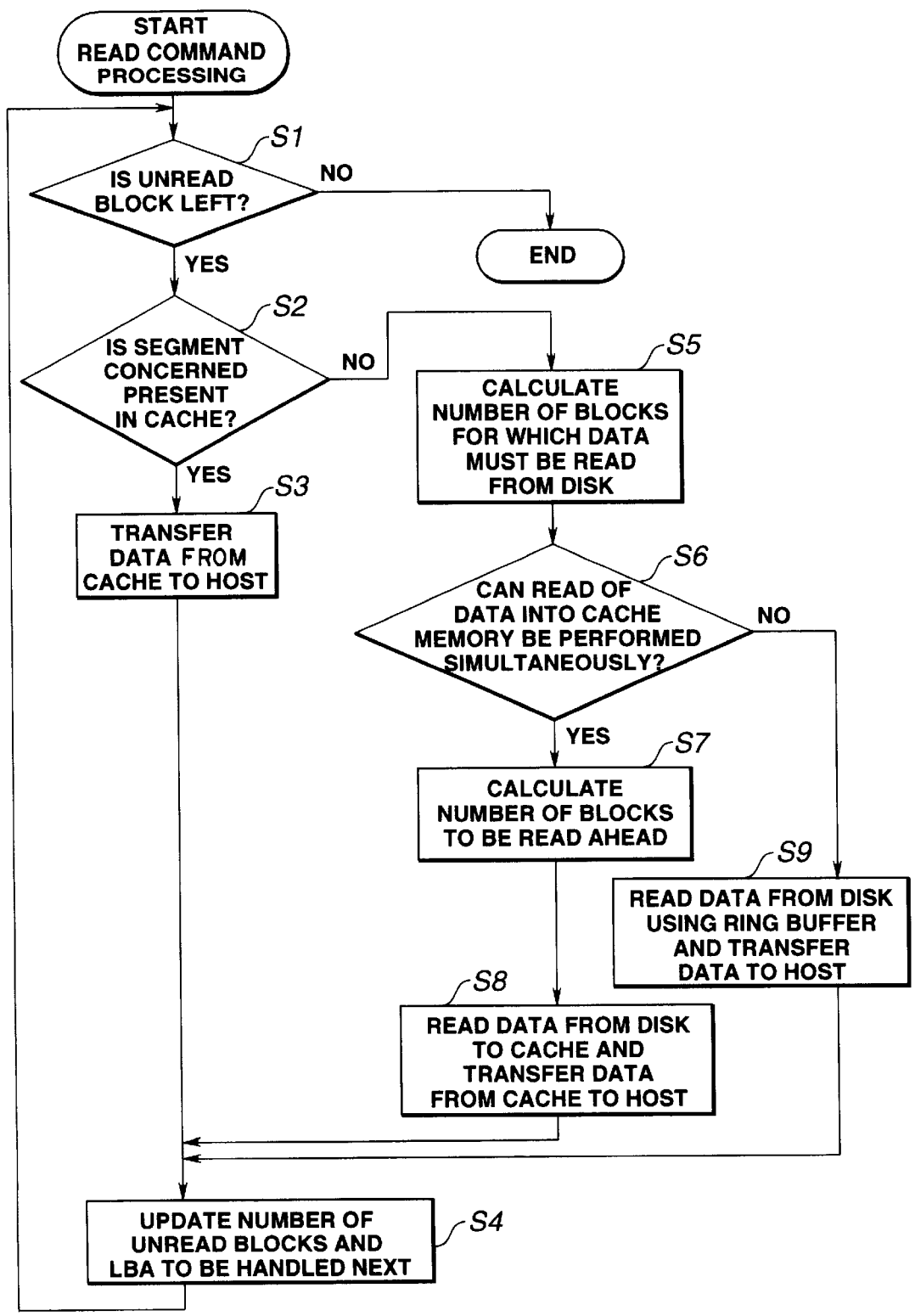
FIG. 6 is a flowchart describing operations responsive to a Read command.

Operations to be carried out with reception of a Read command will be described in conjunction with the flowchart of FIG. 6. In response to a Read command, the CPU 5 judges at step S1 whether or not an unread block from which data should be read remains, or in other words, whether or not data reading executed in response to the Read command is completed. If an unread block remains, the processing of step S2 and thereafter is executed.

At step S2, it is judged whether or not a segment in which data indicated with an LBA specified in the Read command is stored is present, or in other words, whether or not data requested to be read resides in the cache memory and accessing the cache memory is therefore a cache hit. If the segment is present, control is passed to step S3. The data is read from the cache memory 4 and transferred to the host computer. Whether or not accessing the cache memory is a cache hit can be judged readily by referencing the tag table contained in the segmented cache management data area 7b in the main memory 7. At step S4, the number of unread blocks and an LBA indicating data to be processed next are updated. The processing starting at step S1 is repeated.

Using the segmented cache area 4c in this way, whether or not data requested to be read has been written in the cache memory 4 during previous writing and therefore resides in the cache memory 4 can be judged readily. If accessing the cache memory is a cache hit, the data is read from the cache memory 4 and transferred to the host computer. This results in a higher processing speed.

If it is found at step S2 that the segment is absent, the number of blocks allocated to data items that must be read from the disk 9 is calculated at step S5. It is judged from the calculated number of blocks at step S6 whether or not reading the data items into the cache memory 4 can be achieved at a time. If the reading can be achieved, the number of blocks to be read ahead is calculated at step S7. At step S8, intended data items are read from the disk 9 into the segmented cache area 4c in the cache memory 4; and transferred from the cache memory 4 to the host computer. Thereafter, the processing of step S4 is executed and the processing starting at step S1 is repeated.

If it is found at step S6 that reading data into the cache memory 4 cannot be achieved at a time, control is passed to step S9. The ring buffer area 4d in the cache memory 4 is used to read intended data from the disk 9 according to the ring buffer system, and the read data is transferred to the host computer. Thereafter, the processing of step S4 is executed and the processing starting at step S1 is repeated.

If data items cannot be read into the segmented cache area 4c at a time during reading, read data items are stored one after another in the ring buffer area 4d. All of the intended data items can be read into the cache memory 4 during one seek operation and then transferred to the host computer. This results in a higher processing speed.

The foregoing processing loop is executed several times. When blocks to be handled in response to a Read command run out, data reading is terminated.

Figure 7:
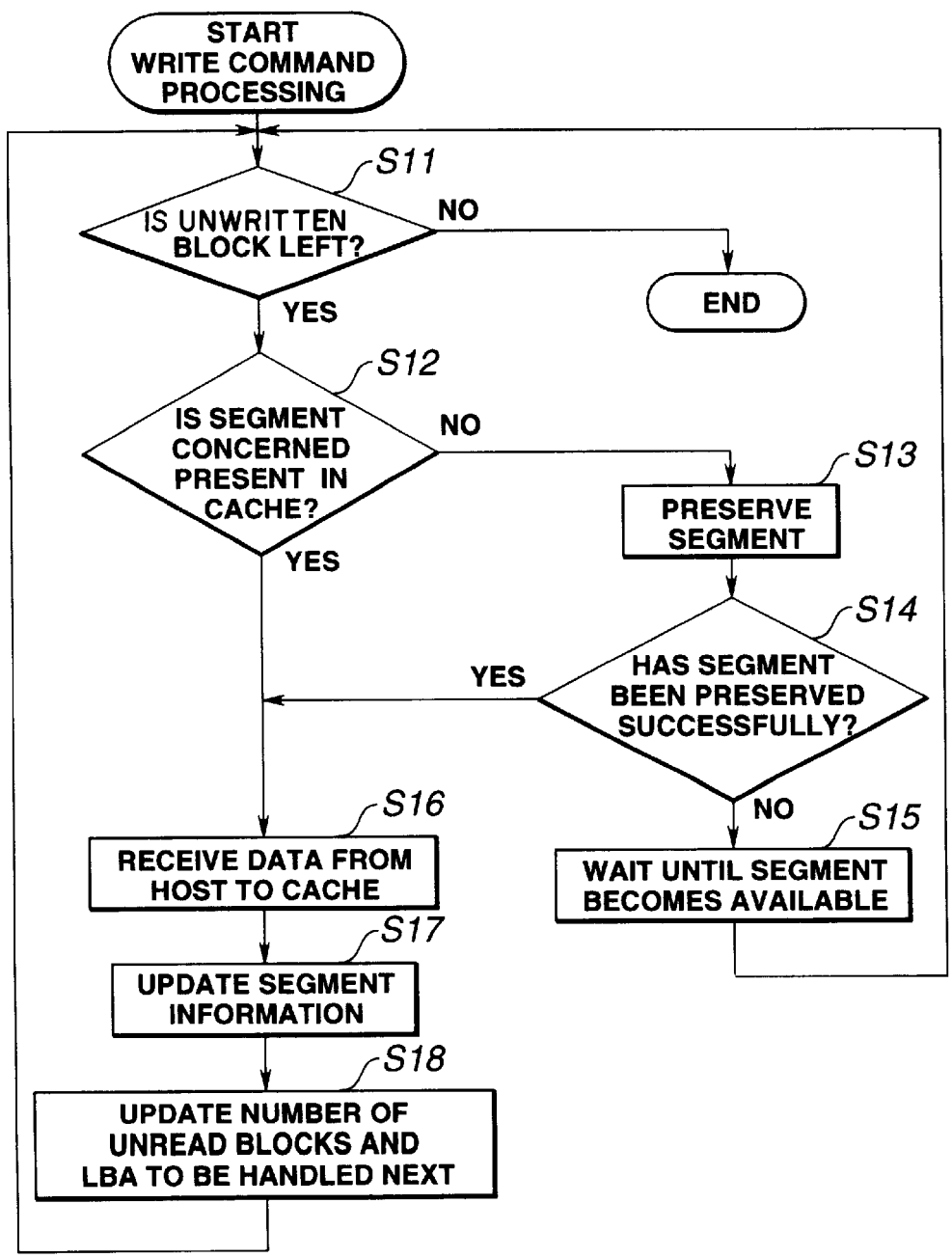
FIG. 7 is a flowchart describing operations responsive to a Write command.

Next, operations to be carried out with reception of a Write command will be described in conjunction with the flowchart of FIG. 7. In response to a Write command, the CPU 5 judges at step S11 whether or not an unwritten block in which data should be written remains, or in other words, whether or not data writing executed in response to the Write command is completed. If an unwritten block remains, the processing of step S12 and thereafter is executed.

At step S12, it is judged whether or not a segment in which data indicated with an LBA specified in a Write command is present in the cache memory 4, or in other words, whether or not a segment in which written data indicated with the same LBA has been stored during previous Write command processing is present in the cache memory. If the segment is absent, control is passed to step S13. A segment in which data is stored is preserved. For example, one of available segments having the smallest segment number is preserved. At step S14, it is judged whether or not preserving a segment succeeds. If no segment is preserved, it is awaited at step S15 that any segment becomes available. The processing starting at step S11 is then repeated. If no segment is available, the tag of an unavailable segment having, for example, the largest LBA or smallest segment number is released.

If a segment in which data is stored can be preserved at step S14, control is passed to step S16. Written data sent from the host computer is received and transferred to the cache memory 4, and then stored in the preserved segment. If it is found at step S12 that the segment is present, control is passed directly to step S16. The written data is received and transferred to the cache memory 4, and stored in the segment by overwriting the segment.

As mentioned above, when a Write command relevant to the same LBA is received, written data is stored in the same segment. Thus, the use efficiency of the cache memory can be improved.

After written data is stored in the cache memory 4, sorting the contents of the tag table and rewriting the contents of the segment information table are carried out according to the stored data at step S17. Thus, segment information is updated. At step S18, the number of unwritten blocks and an LBA indicating data to be processed next are updated. The processing starting at step S11 is then repeated.

The foregoing processing loop is executed several times. When blocks to be handled in response to a Write command run out, written data receiving is terminated. The CPU 5 informs the host computer of completion of Write command processing, and instructs to perform reading of data from the cache memory 4 and writing of the data on the disk 9 during an idle time.

Now, a method of dividing the segmented cache area 4c in the cache memory 4 will be described. Assume that the number of segments is fixed to 80. In this embodiment, any of a plurality of memories having segmented cache areas of different storage capacities (buffer sizes) is used to construct an information recording/reproducing apparatus. Besides, a common program to be provided in the form of firmware is used to control a drive unit. In this case, the number of segments is fixed to an optimal value that is a necessary and sufficient value to be determined according to the conditions for a means for managing a cache memory; such as, the storage capacity of a segmented cache management data area in a main memory. The size of each segment (number of blocks) is made variable depending on the storage capacity of a different cache memory.

Assume that the buffer size is 512K bytes, the number of segments is 80, and one segment is, as shown in FIG. 8A, divided into 8 blocks. When the buffer size is 2M bytes (2048K bytes) and the number of segments is 80, one segment is, as shown in FIG. 8B, composed of 32 blocks.

When four random Write commands (LBA=0, 500, 250, 100) are received from the host computer, written data items WD1 to WD4 relevant to the commands can be stored in the 32 blocks shown in FIG. 8A. However, in the 32 blocks shown in FIG. 8B, only the written data WD1 relevant to one command can be stored. Nevertheless, when the number of segments in the whole segmented cache area is fixed to the same value, for example, 80 as it is in this embodiment, even if a random Write command is issued 40 consecutive times, written data items can be stored at a time.

Specifically, as far as the storage capacity of the segmented cache area remains the same, if the number of segments is made large, written data items relevant to a large number of Write commands can be stored. The total number of segments within the segmented cache area is limited by the storage capacity of the segmented cache management data area. When the number of segments is made too large, it takes too much time to retrieve data from the cache memory. Consequently, the number of segments should be set to a value for permitting the cache memory to exhibit satisfactory performance while being limited by the storage capacity of the segmented cache management data area. For example, the number of segments is set to a maximum number of segments which is permissible under the conditions for an information recording/reproducing apparatus.

On the contrary, when the number of blocks per segment is fixed (to, for example, 32) and the number of segments is made variable, if the buffer size is small, the number of segments gets small. The number of Write commands to be handled to store data items at a time gets small. Assume that the buffer size is 2M bytes, the number of blocks per segment is 32, and the number of segments is 80. When the buffer size is 512K bytes and the number of blocks per segment is 32, the number of segments is 20. When a random Write command is issued 40 consecutive times, if the buffer size is 512K bytes, written data items cannot be stored at a time. It must be awaited that any segment in the cache memory becomes available. There is therefore the fear of deteriorating performance of handling a random Write command.

By contrast, according to the configuration of this embodiment, the number of segments is fixed to an optimal value that is a necessary and sufficient value according to the conditions for a means for managing a cache memory, such as, the storage capacity of a segmented cache management data area. Even when a cache memory having a different buffer size is used to construct an information recording/reproducing apparatus, the apparatus can always exhibit the same performance of handling a random Write command. Besides, the processing speed for reading or writing can be improved. Moreover, when a control unit to be operated by running a common program provided in the form of firmware is used for reducing cost, if a cache memory having a different buffer size is employed, a segmented cache type cache memory composed of an optimal number of segments can be structured irrespective of the buffer size, and the cache memory can exhibit satisfactory performance.

As described above, according to this embodiment, when a segmented cache type cache memory is used, a segmented cache area having an optimal number of segments can be defined according to the conditions for a cache memory managing means. The cache memory can therefore exhibit satisfactory performance. Moreover, the processing speed for reading or writing can be improved.

According to the present invention, it is apparent that a wide range of different embodiments can be constructed on the basis of the invention without a departure from the spirit and scope of the invention. This invention is limited to the appended claims but not restricted to any specific embodiments.

What is claimed is:

1. An information recording/reproducing apparatus for recording or reproducing information on or from a recording medium, comprising:

a segmented cache type cache memory having a storage area thereof divided into a plurality of segments and temporarily storing data to be transferred between an upper-level host computer and a recording medium in said segments; and a cache memory managing means for controlling reading or writing of data from or in said cache memory and for managing said data, said cache memory managing means having an operation program, wherein the number of segments into which the storage area of said cache memory is divided is set based on an optimal number of segments based on performance of said operation program and management data storage memory existent in said cache memory managing means, and the size of each segment is set to a value permitting the set number of segments according to the storage capacity of said cache memory.

2. An information recording/reproducing apparatus according to claim 1, wherein the number of segments constituting said cache memory is set to a permissible maximum number of segments according to the storage capacity of said management data storage memory in said cache memory managing means.

3. An information recording/reproducing apparatus according to claim 1, wherein the storage area of said cache memory is divided into a plurality of segments so that the storage area has the set number of segments, the number of segments is fixed irrespective of whether the storage capacity of the storage area of said cache memory is large or small, and the size of each segment is set according to the storage capacity.

4. An information recording/reproducing apparatus according to claim 1, wherein the storage area of said cache memory is divided into a plurality of segments so that the storage area has the set number of segments, and the size of each segment is increased or decreased according to whether the storage capacity of the storage area of said cache memory is large or small.

* * * * *